United States Patent [19]
Murata

[11] Patent Number: 6,086,624
[45] Date of Patent: Jul. 11, 2000

[54] SIMULATOR AND SIMULATION METHOD IN EACH OF WHICH SIMULATION CAN BE CARRIED OUT AT A HIGH-SPEED

[75] Inventor: Teruyuki Murata, Tokyo, Japan

[73] Assignee: NEC Corporation, Tokyo, Japan

[21] Appl. No.: 08/891,386

[22] Filed: Jul. 11, 1997

[30] Foreign Application Priority Data

Jul. 15, 1996 [JP] Japan ................................. 8-184930

[51] Int. Cl.[7] .................................................. G06F 9/44
[52] U.S. Cl. ............................ 703/26; 703/27; 395/708; 395/710
[58] Field of Search .............................. 395/500, 709, 395/707, 708, 710, 183.11, 183.14, 500.47, 500.48; 364/489, 490, 578, 736; 703/26, 27

[56] References Cited

U.S. PATENT DOCUMENTS

| | | | |
|---|---|---|---|
| 4,951,195 | 8/1990 | Fogg, Jr. et al. | 364/200 |
| 5,572,436 | 11/1996 | Dangelo et al. | 364/489 |
| 5,577,233 | 11/1996 | Goettelmann et al. | 395/500 |
| 5,630,102 | 5/1997 | Johnson et al. | 395/500 |
| 5,764,962 | 6/1998 | Buzbee | 395/500 |
| 5,771,370 | 6/1998 | Klein | 395/500 |
| 5,839,948 | 11/1998 | Bunza | 395/500 |

FOREIGN PATENT DOCUMENTS

6-250874  9/1994  Japan ............................. G06F 11/26

*Primary Examiner*—Kevin J. Teska
*Assistant Examiner*—Thai Phan
*Attorney, Agent, or Firm*—Scully, Scott, Murphy & Presser

[57] ABSTRACT

In a simulator for simulating, on a host computer having a host central processing unit, a target program (100) which is prepared for execution on a target computer and has a typical process part representing a typical process (1000-1) and an atypical process part representing an atypical process (1001), the typical process is executed in accordance with an instruction of the host central processing unit. On the other hand, the atypical process is executed in accordance with the atypical process part with interpreting the target program.

9 Claims, 6 Drawing Sheets

SIMULATOR AND SIMULATION METHOD IN EACH OF WHICH SIMULATION CAN BE CARRIED OUT AT A HIGH-SPEED

BACKGROUND OF THE INVENTION

The present invention relates to a simulator and a simulation method for simulating, on a host computer, a target program prepared for execution on a target computer.

In general, a simulator has as data an instruction sequence of a target program which is prepared for execution on a target computer, and performs interpretation and execution of those data per instruction through a host computer on which the simulator operates, so as to simulate an operation of the target computer. Specifically, since an execution environment including a central processing unit (CPU) and a memory differs between the target computer and the host computer, the simulator establishes on the host computer a storage area (target memory) and a CPU register area (target register) simulating the execution environment of the target computer, interprets the instructions of a target CPU through the software and performs processes corresponding to those instructions relative to the target memory so as to simulatively realize the operation of the target computer.

Another simulator is known which has a table of the number of clocks required for executing each instruction on the target computer and adds a value thereof per instruction to roughly estimate the total number of execution clocks. In such a simulator, by adding a peripheral circuit simulator which operates synchronously with the obtained number of clocks, an interrupt can be simulated which is synchronous with the number of execution clocks from a timer, an external communication device or the like.

However, in the foregoing simulation methods, since it takes time to interpret each instruction through the software, the execution speed is much lower as compared with an operation of the intrinsic target computer. In view of this, a simulation method which is capable of solving such a problem, that is, capable of a high-speed simulation, has been proposed.

For example, Japanese First (unexamined) Patent Publication No. 6-250874 discloses one example of a high-speed simulator. In the manner which will later be discussed in conjunction with the drawing, the example interprets the instructions of the target program and converts them into the corresponding simulation function calling means in advance. Therefore, it is not required to carry out the interpretation of the instructions through the software upon execution of the simulation so that the simulation can be performed at high speed.

In the foregoing conventional simulator, however, since the target CPU and the host CPU differ from each other, the number of execution clocks required for execution of the target program at the target CPU can not be derived from the number of execution clocks required for execution of the converted program at the host CPU. That is, data about the number of execution clocks required for actually running the target program on the target computer including the target CPU can not be obtained.

Further, in the conventional simulator, since the data about the number of execution clocks can not be obtained, an interrupt from a peripheral circuit, such as a timer, synchronous with the CPU clock can not be simulated.

An influence of the foregoing problems is significant when a built-in type CPU is a target of the simulation since the process flow frequently changes upon interrupts from peripheral circuits in a program for the built-in type CPU.

SUMMARY OF THE INVENTION

It is therefore an object of the present invention to provide a simulator which is capable of a high-speed simulation.

It is another object of the present invention to provide a simulator of the type described, which is capable of acquiring data about the number of clocks required for execution of a target program.

It is still another object of the present invention to provide a simulator which is capable of simulating an interrupt from a peripheral circuit.

It is yet another object of the present invention to provide a simulation method which is capable of a high-speed simulation.

Other objects of this invention will become clear as the description proceeds.

According to the present invention, there is provided a simulator for simulating, on a host computer having a host central processing unit, a target program which is prepared for execution on a target computer and comprises a typical process part representing a typical process and an atypical process part representing an atypical process. The simulator comprises typical-process executing means for executing the typical process in accordance with an instruction of the host central processing unit, atypical-process executing means for interpreting the target program to execute the atypical process in accordance with the atypical process part, and control means connected to the typical-process executing and the atypical-process executing means for controlling operations of the typical-process executing and the atypical-process executing means.

According to the present invention, there is provided a method of simulating, on a host computer having a host central processing unit, a target program which is prepared for execution on a target computer and comprises a typical process part representing a typical process and an atypical process part representing an atypical process. The method comprises the steps of executing the typical process in accordance with an instruction of the host central processing unit, interpreting the target program to execute the atypical process in accordance with the atypical process part, and controlling the executing step and the interpreting step.

DESCRIPTION OF THE PREFERRED EMBODIMENTS

Figure 1:
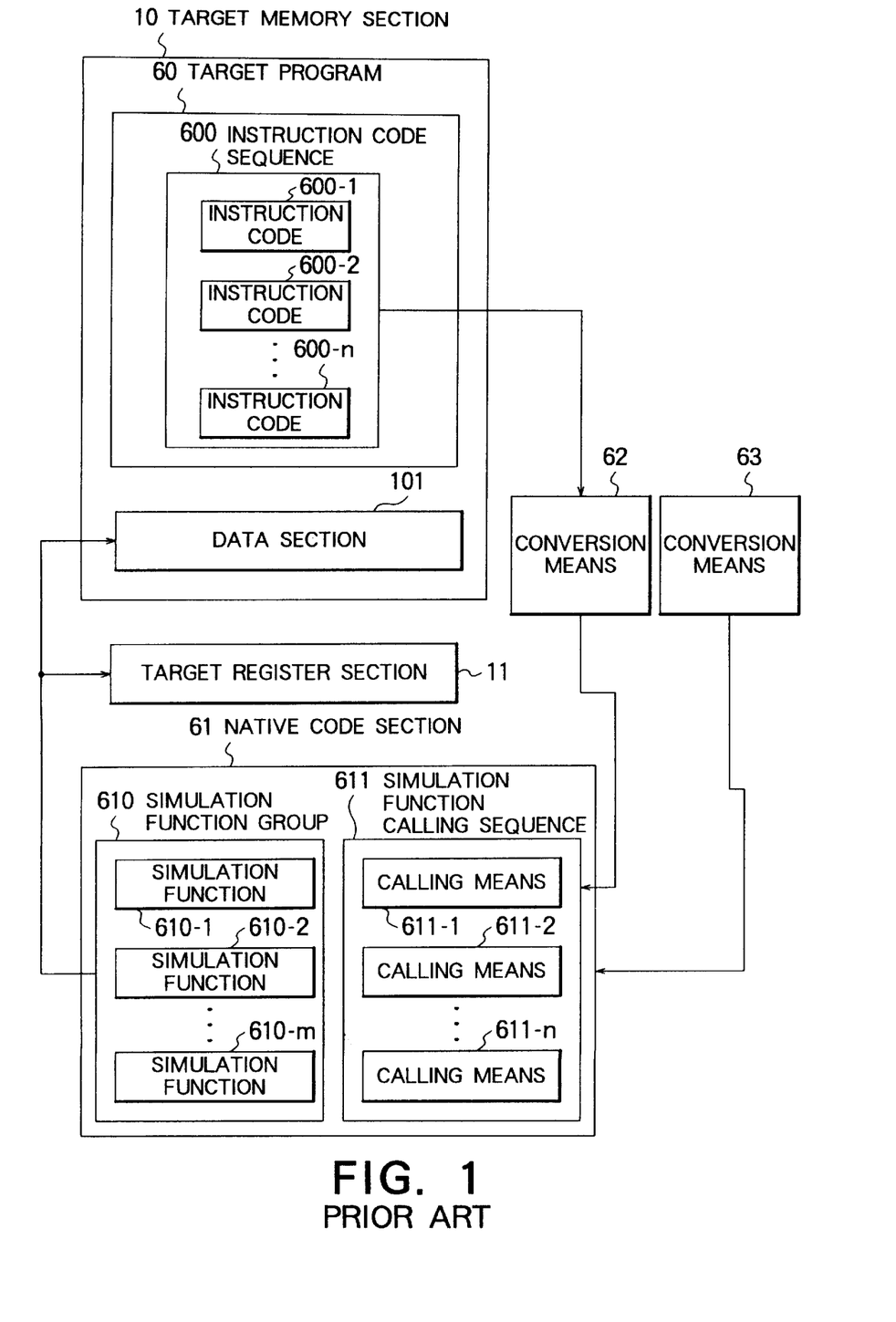
FIG. 1 is a diagram showing a structure of a conventional simulator.

Referring to FIG. 1, description will be made at first as regards a conventional simulator for better understanding of the present invention, The conventional simulator corresponds to the simulator disclosed in Japanese First (unexamined) Patent Publication No. 6-250874.

The conventional simulator includes a target memory section 10 and a target register section 11 which simulate a memory of a target computer and a target CPU register on a host computer, respectively. The target memory section 10 stores therein a target program 60 which includes an instruction code sequence 600 composed of instruction codes 600-1 to 600-n. The simulator further includes a native c ode section 61 composed of instructions of a host CPU (native codes). The native code section 61 includes a simulation function group 610 and a simulation function calling sequence 611. The simulation function group 610 includes simulation functions 610-1 to 610-m for simulating all the instructions of the target CPU with the native codes. The simulation functions are functions for performing, relative to the target memory section 10 and the target register section 11, th e same operations as those performed upon simulation of the instructions of the target CPU, using the native codes.

The simulation function calling sequence 611 includes calling means 611-1 to 611-n each representing the calling of the corresponding simulation function. Specifically, the instruction codes 600-1 to 600-n of the target program 60 are converted through conversion means 62 into the calling of the corresponding simulation functions 610-1 to 610-m which is represented by the calling means 611-1 to 611-n. The execution of the native code section 61 is controlled by execution means 63.

The conversion means 62 is called prior to the execution of the simulation to convert the instruction codes 600-1 to 600-n included in the instruction code sequence 600 of the target program 60 into the corresponding simulation function calling means 611-1 to 611-n, respectively.

The simulation is carried out through execution of the simulation function calling sequence 611 by the execution means 63. Specifically, by calling the corresponding simulation functions 610-1 to 610-m in the same order as that of the instruction code sequence 600 of the target program 60, an operation of the target computer is simulated.

Figure 2:
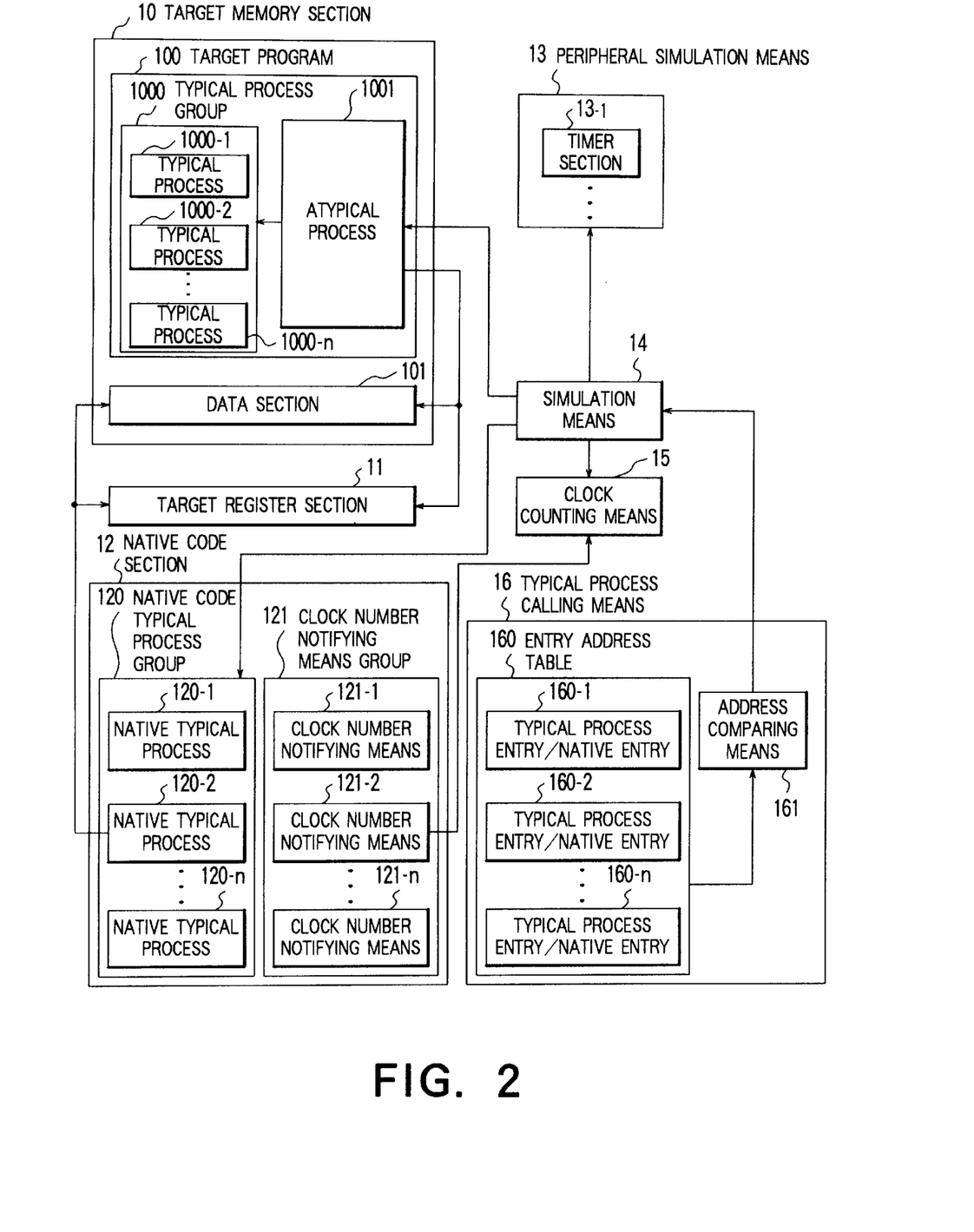
FIG. 2 is a diagram showing a structure of a simulator according to a first embodiment of the present invention.

Referring to FIG. 2, the description will be made as regards a simulator according to a first embodiment of the present invention. The simulator is for simulating, on a host computer having a host central processing unit, a target program 100 which is prepared for execution on a target computer.

In general, such a target program includes a typical process, such as a system call of an operating system or a run-time library of a compiler, which is commonly called out by a plurality of programs, and an atypical process peculiar to the target program.

The target program 100 is divided into a typical process group 1000 and an atypical process 1001. The typical process group 1000 includes a plurality of typical processes 1000-1 to 1000-n. In other words, the target program 100 comprises a typical process part representing a typical process and an atypical process part representing an atypical process.

As an execution environment of a target computer, a target memory section 10 and a target register section 11 are established on a host computer, and the target program 100 is stored in the target memory section 10. The target memory section 10 further includes a data section 101 which is used by the program.

The simulator further includes simulation means 14 for controlling execution of a simulation, clock counting means 15 for counting the number of execution clocks, and peripheral simulation means 13 for simulating a peripheral circuit around the CPU. The peripheral simulation means 13 includes a timer section 13-1 for generating an interrupt at every preset time interval.

A native code section 12 includes a native code typical process group 120 and a clock number notifying means group 121 which will be referred to as a clock number determining arrangement. The group 120 includes native typical processes 120-1 to 120-n for performing, using native codes, the same operations as those of the typical processes 1000-1 to 1000-n included in the typical process group 1000 of the target program 100.

The group 121 includes clock number notifying means 121-1 to 121-n each for prestoring the number of clocks required for execution of the corresponding typical process and notifying it to the clock counting means 15. The native typical processes 120-1 to 120-n and the clock number notifying means 121-1 to 121-n correspond to each other.

Further, typical process calling means 16 includes an entry address table 160 having entry pairs 160-1 to 160-n each representing a start or entry address of the corresponding typical process on the target program 100 and an entry address of the corresponding native typical process on the host computer, and address comparing means 161 for comparing the entry addresses stored in the entry address table 160 and an address of an instruction to be executed next by the simulation means 14 so as to detect the start of the typical process.

Any method may be used for realizing the typical processes in the target program in the form of the native codes of the host computer. For example, two typical process programs which achieve the same operation may be developed for the target computer and the host computer, or conversion means may be used for reading the typical processes from the target program and outputting the native codes which achieve the same operation, or different compilers may be used to output the typical processes for the target computer and the host computer from a high-level language source program.

Further, any method may be used for deriving the number of execution clocks required for each typical process. For example, the number of clocks may be counted in advance based on an assembly language source program of the typical process, or the typical process may be executed on the target computer so as to count the number of clocks. The foregoing realization of the typical process in the form of the native codes and the foregoing derivation of the number of execution clocks may be carried out only once for each of the typical processes.

Figure 3:
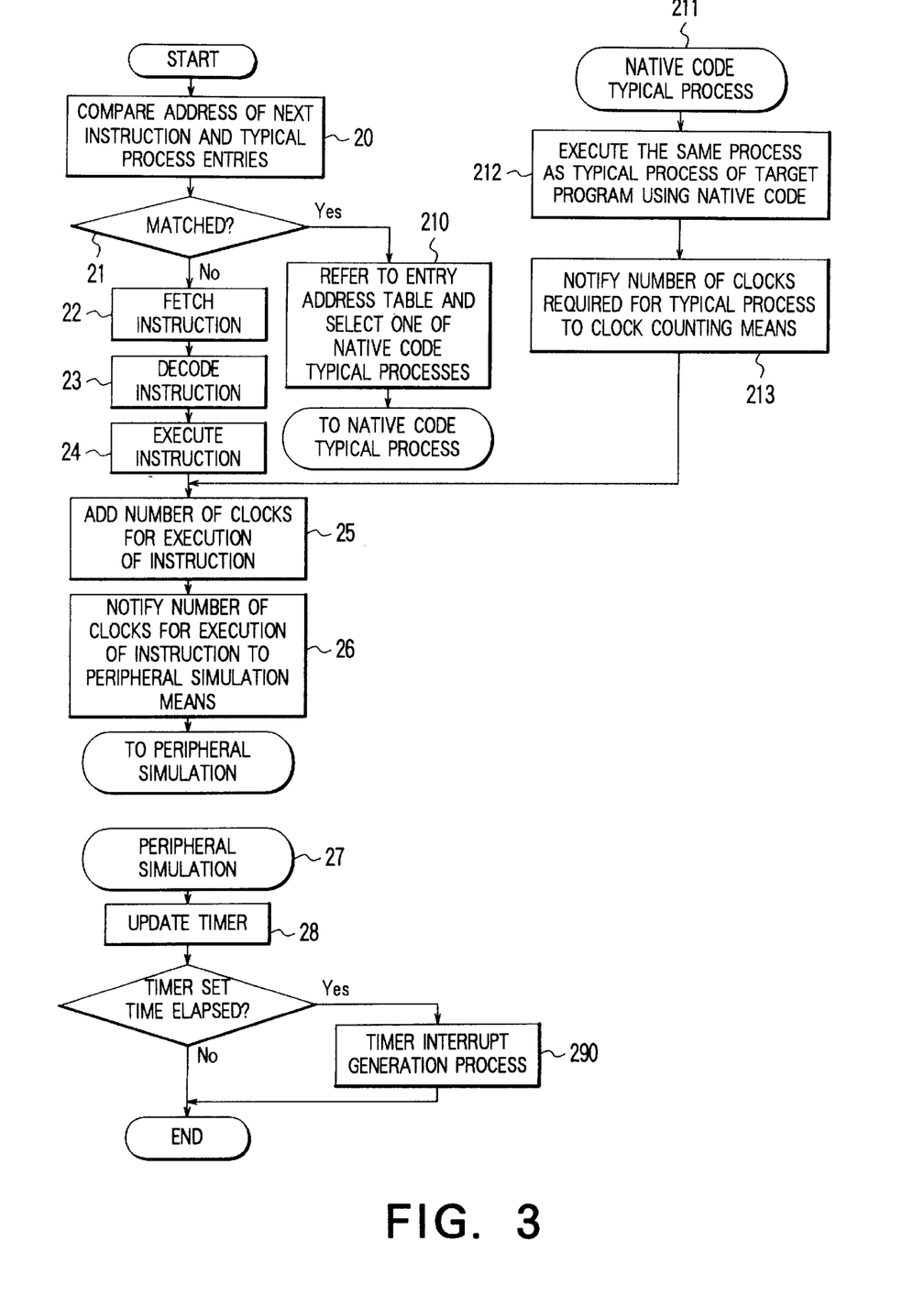
FIG. 3 is a flowchart for explaining an operation of the simulator shown in FIG. 2.

Referring now to FIG. 3, an operation of the simulator shown in FIG. 2 will be described. When execution of the simulator is started, the address comparing means 161 compares, at step 20, an address of an instruction to be executed next by the simulation means 14 with the typical process entry addresses 160-1 to 160-n of the entry address table 160. Then, at step 21, if matched with one of the typical process entry addresses, it means the start of the corresponding typical process, and hence, the routine proceeds to step 210 for carrying out this typical process with the native codes. On the other hand, if not matched at step 21, the routine proceeds to step 22 for carrying out a simulation of the atypical process. On carrying out the step 21, the address comparing means 161 will be referred to as a detecting arrangement which produces a detection signal when the typical process part of the target program 100 is interpreted.

First, the simulation of the atypical process will be described. Step 22 fetches an instruction to be executed from the target memory section 10, then step 23 decodes it and step 24 executes it. On carrying out the step 24, the simulation means 14 is referred to as an atypical-process executing arrangement for executing the atypical process in accordance with the atypical process part of the target program 100.

At step 25, the clock counting means 15 adds the number of clocks required for execution of the instruction. In this event, the clock counting means 15 will be referred to as a clock number updating arrangement. Then, at step 26, the same number of clocks is notified to the peripheral simulation means 13. The peripheral simulation means 13 executes a peripheral simulation 27. The contents of the process differ depending on the target system, and the peripheral simulation means 13 is constituted in a manner to match it. Assuming that a peripheral circuit is a timer, step 28 updates a value of the timer section 13-1, and then step 29 checks whether a time preset in the timer section 13-1 has elapsed. If positive at step 29, the routine proceeds to step 290 where a timer interrupt generation process is executed.

The foregoing routine is the execution flow per instruction. Thus, for executing a plurality of atypical process instructions, the foregoing routine is repeated.

Now, the simulation of the typical process will be described. After execution of step 210 where the native entry address corresponding to the typical process matched at step 21 is read out from the entry address table 160 and corresponding one of the native typical processes 120-1 to 120-n is selected, the routine proceeds to the native code typical process. In the native code typical process, step 212 executes the same process as the corresponding typical process of the target program using the native codes, and then step 213 notifies, through corresponding one of the clock number notifying means 121, the number of execution clocks required for execution of the corresponding native typical process to the clock counting means 15. On carrying out the step 212, the simulation means 14 is referred to as a typical-process executing arrangement for executing the typical process in accordance with an instruction of the host central processing unit.

Thereafter, the routine proceeds to step 25 for execution of the peripheral simulation as described in the foregoing atypical process simulation. Specifically, a lot of instructions of the typical process are executed with the native codes as if they were one instruction, and thus are not required to be interpreted and executed one by one by the software.

Figure 4:
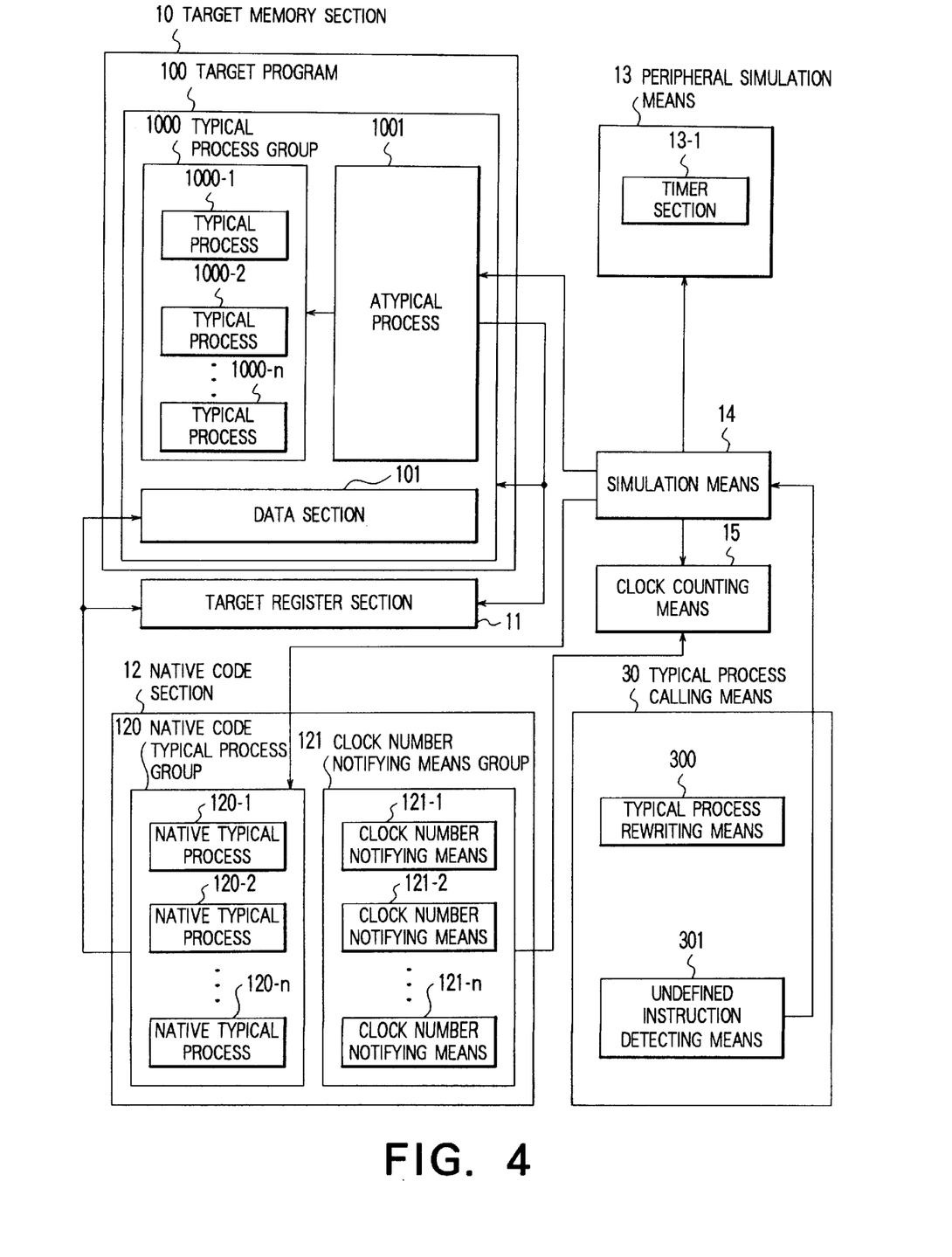
FIG. 4 is a diagram showing a structure of a simulator according to a second preferred embodiment of the present invention.

Turning to FIG. 4, the description will be directed to a simulator according to a second embodiment of the present invention. In FIG. 4, since a target memory section 10, a target register section 11, a native code section 12, peripheral simulation means 13, simulation means 14 and clock counting means 15 are the same as those shown in FIG. 2, explanation thereof is omitted for avoiding redundant disclosure. Typical process calling means 30 differs from the typical process calling means 16 shown in FIG. 2.

Typical process rewriting means 300 rewrites instructions at entry addresses of all the typical processes 1000-1 to 1000-n included in the typical process group 1000 into undefined instructions, trap instructions or the like which are not used normally in the program and cause an exception, that is, an interrupt due to error, when executed in the target CPU, and further rewrites subsequent several bytes therefrom (the number of bytes depends on the host CPU) to represent entry addresses of the native typical processes 120-1 to 120-n. In this embodiment, the undefined instructions are used. Undefined instruction detecting means 301 detects the rewritten undefined instruction and calls the corresponding native typical process.

Figure 5:
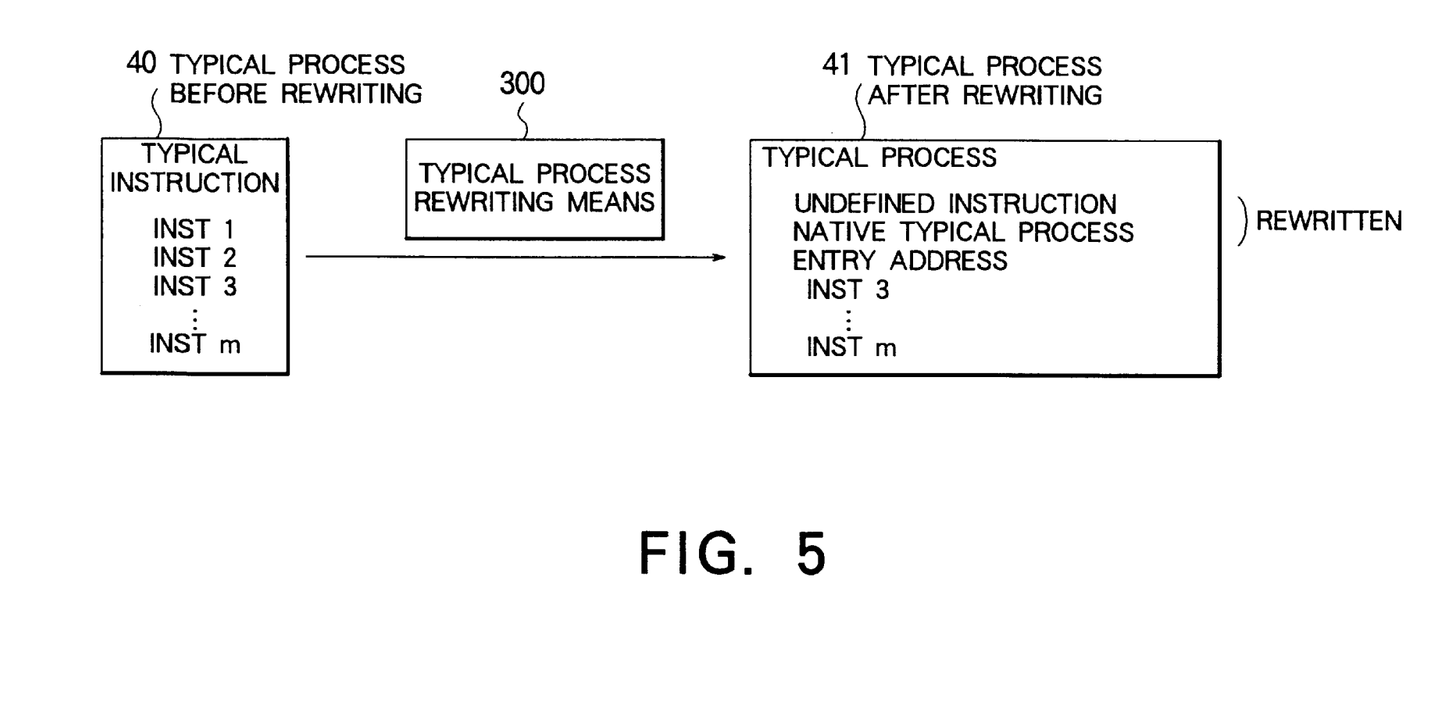
FIG. 5 is a diagram for explaining rewriting of a typical process achieved by typical process rewriting means in the simulator shown in FIG. 4.

Referring now to FIG. 5 together with FIG. 4, the description will be made as regards an operation of the simulator.

FIG. 5 shows an example of rewriting achieved by the typical process rewriting means 300. It is assumed that a before-rewriting typical process 40 is composed of an instruction sequence including instructions 1 to m. The typical process rewriting means 300 rewrites the head of the typical process into an undefined instruction of the target CPU and further rewrites the subsequent several bytes to represent an entry address of the native typical process. In FIG. 5, the bytes corresponding to one instruction are rewritten into the entry address of the native typical process. Through the foregoing rewriting, an after-rewriting typical process 41 is produced.

Since an exception occurs when executing an instruction at an entry address of the typical process, the start of the typical process can be known by detecting it. Since an entry address of the corresponding native typical process is stored subsequently, this value is used as a calling address. Accordingly, the entry address table 160 required in FIG. 2 is not required in FIG. 4.

The foregoing rewriting is performed before execution of the simulation so that the total execution time of the simulation is not substantially influenced. On the other hand, those conditions should be satisfied for applying the method explained with reference to FIG. 3 that the typical process is longer than the number of bytes to be rewritten and that the address to be rewritten is not subjected to execution from other than the typical process (excluding the entry address of the typical process).

Figure 6:
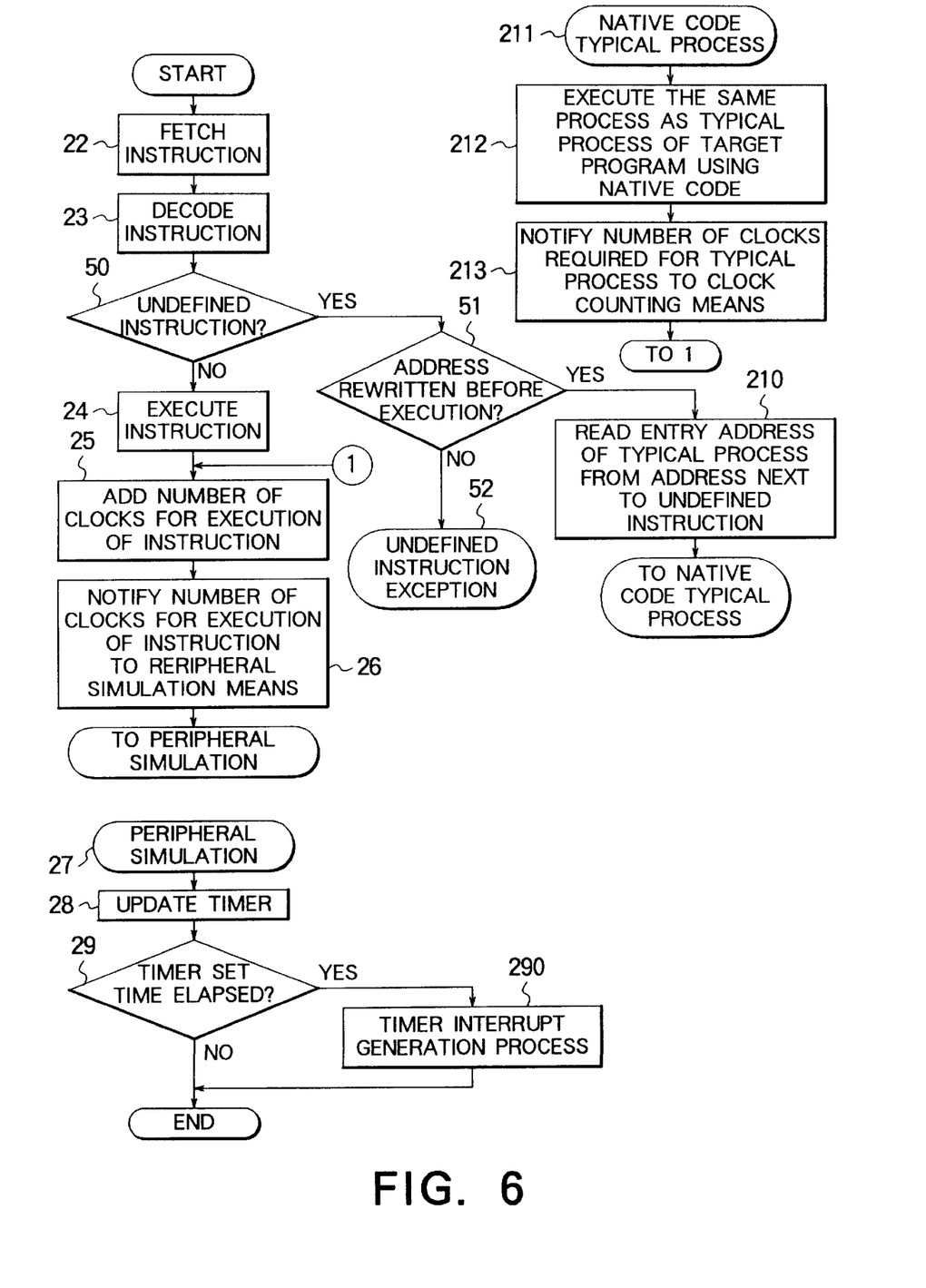
FIG. 6 is a flowchart for explaining an operation of the simulator shown in FIG. 4.

Referring now to FIG. 6, the description will be made as regards the simulation achieved by the simulator shown in FIG. 4. Step 22 fetches an instruction, then step 23 decodes it and step 50 determines whether the decoded instruction is an undefined instruction. If negative at step 50, step 24 executes an instruction of the atypical process. Since the routine after step 24 is the same as that shown in FIG. 3, explanation thereof is omitted.

On the other hand, if positive at step 50, that is, the undefined instruction detecting means 301 detects the undefined instruction, the routine proceeds to step 51 which determines whether it is an address rewritten in advance. Unless it is the rewritten address, it means that an undefined instruction really exists at that address. Thus, step 52 produces an undefined instruction exception. Since the handling of the undefined instruction exception does not relate to the present invention, explanation thereof is omitted.

On the other hand, if step 51 determines it to be the rewritten address, the routine proceeds to step 210 which reads out an entry address of the native typical process written next to the undefined instruction. Then, the routine proceeds to step 211 for execution of the native typical process corresponding to the read-out entry address. The execution of the native typical process and the execution of the subsequent peripheral simulation are the same as those explained with reference to FIG. 3.

The simulator shown in FIG. 4 achieves the same effects as those achieved by the simulator shown in FIG. 2 and further increases the speed of the process. Specifically, in the simulator shown in FIG. 2, it is necessary that the address comparing means 161 compares the address to be executed with the typical process entry addresses of the entry address table 160 per instruction during execution of the normal simulation. On the other hand, in the simulator shown in FIG. 4, when the undefined instruction detecting means 301 detects the undefined instruction, the native typical process entry address can be read out from the next address so that the address comparison is not required at all.

The simulators described above achieve the following effects.

The atypical process is simulated per instruction by the software while the typical process is directly executed using the high-speed native code. Thus, the high-speed simulation can be achieved without deteriorating a simulation debug function of the atypical process.

The number of clocks required for execution of the typical process is derived in advance, and this value is notified to the clock counting means via the clock number notifying means of the native code section. Thus, the data about the number of execution clocks can be obtained while enabling the high-speed simulation.

Since the data about the number of execution clocks can be obtained, the interrupt from the peripheral circuit can be generated by operating the peripheral circuit simulator in synchronism with the number of execution clocks. Thus, while enabling the high-speed simulation, the program using the interrupt from the peripheral circuit which operates synchronously with the clocks, can be correctly simulated.

While the present invention has thus far been described in connection with a few embodiments thereof, it will readily be possible for those skilled in the art to put this invention into practice in various other manners.

What is claimed is:

1. A simulator for simulating, on a host computer having a host central processing unit, a target program which is prepared for execution on a target computer and comprises a typical process part representing a typical process which is commonly executed by a plurality of programs and an atypical process part representing an atypical process which is peculiar to the target program, said simulator comprising:

typical-process executing means for executing said typical process in accordance with at least an instruction of said host central processing unit other than instructions of said target computer;

atypical-process executing means for interpreting said target program to execute said atypical process in accordance with said atypical process part; and control means, connected to said typical-process executing means and said atypical-process executing means, for controlling operations of said typical-process executing means and said atypical-process executing means.

2. A simulator as claimed in claim 1, further comprising:

detecting means connected to said atypical-process executing means for detecting whether or not said atypical-process executing means interprets said typical process part of the target program, said detecting means producing a detection signal when said atypical-process executing means interprets said typical process part;

means connected to said detecting and said typical-process executing means for actuating said typical-process executing means in response to said detection signal to make said typical-process executing means execute said typical process in accordance with the instruction of said host central processing unit.

3. A simulator as claimed in claim 1, wherein said target program is executed in accordance with clocks, said simulator further comprising:

clock counting means connected to said atypical-process executing means for counting up a count value in response to each of said clocks when said atypical-process executing means execute said atypical process part of the target program;

clock number determining means for determining, as a particular number, a number of said clocks required for an execution of said typical process part of the target program; and clock number updating means connected to said clock number determining, said clock counting, and said typical-process executing means for updating said count value in accordance with said particular number after said typical-process executing means executes said typical process part.

4. A simulator as claimed in claim 3, further comprising:

peripheral simulation means for simulating a peripheral circuit which operates synchronously with said clocks on said target computer; and means connected to said peripheral simulation means and said typical-process executing means for actuating said peripheral simulation means synchronously with said clocks after said typical-process executing means executes said typical process part of the target program.

5. A simulator as claimed in claim 1, further comprising:

an entry address table recording a pair of an entry address of said typical process part on said target program and an entry address of said instruction on said host central processing unit; and address comparing means connected to said entry address table for comparing an address of an instruction to be executed next by the simulator and said pair on said entry address table.

6. A method of simulating, on a host computer having a host central processing unit, a target program which is prepared for execution on a target computer and comprises a typical process part representing a typical process and an atypical process part representing an atypical process, said method comprising the steps of:

executing said typical process in accordance with at least an instruction of said host central processing unit other than instructions of said target computer;

interpreting said target program to execute said atypical process in accordance with said atypical process part; and controlling the executing step and the interpreting step.

7. A method as claimed in claim 6, further comprising the steps of:

detecting whether or not said typical process part of the target program is interpreted;

producing a detection signal when said typical process part is interpreted; and executing said typical process part in response to said detection signal process in accordance with the instruction of said host central processing unit.

8. A method as claimed in claim 6, wherein said target program is executed in accordance with clocks, said method further comprising the steps of:

counting up a count value in response to each of said clocks when said atypical process part of the target program is executed;

determining, as a particular number, a number of said clocks required for an execution of said typical process part of the target program; and updating said count value in accordance with said particular number after said typical process part is executed.

9. A method as claimed in claim 8, further comprising the step of simulating a peripheral circuit synchronously with said clocks after said typical process part of the target program is executed.

* * * * *